United States Patent
Kraewer et al.

(10) Patent No.: US 11,339,697 B2
(45) Date of Patent: May 24, 2022

(54) LAMBDA COMPENSATION WITH EXHAUST-GAS BURNER

(71) Applicant: Robert Bosch GmbH, Stuttgart (DE)

(72) Inventors: Bernd Kraewer, Winnenden (DE); Michael Fey, Wiernsheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/179,368

(22) Filed: Feb. 18, 2021

(65) Prior Publication Data

US 2021/0254525 A1  Aug. 19, 2021

(30) Foreign Application Priority Data

Feb. 19, 2020 (DE) .......................... 102020202136.8

(51) Int. Cl.
*F01N 3/20* (2006.01)
*F01N 11/00* (2006.01)

(52) U.S. Cl.
CPC ............ *F01N 3/2006* (2013.01); *F01N 11/00* (2013.01); *F01N 3/2033* (2013.01); *F01N 2560/025* (2013.01); *F01N 2900/08* (2013.01); *F01N 2900/1402* (2013.01); *F01N 2900/16* (2013.01)

(58) Field of Classification Search
CPC ...... F01N 3/2006; F01N 11/00; F01N 3/2033; F01N 2900/1402; F01N 2560/025; F01N 2900/16; F01N 2900/08
See application file for complete search history.

(56) References Cited

U.S. PATENT DOCUMENTS

| | | | |
|---|---|---|---|
| 2019/0211725 A1* | 7/2019 | Pau | F01N 3/023 |
| 2020/0232364 A1* | 7/2020 | Baron Von Ceumern-Lindenstjerna | F01N 3/101 |
| 2021/0040873 A1* | 2/2021 | Baron Von Ceumern-Lindenstjerna | F01N 3/025 |

FOREIGN PATENT DOCUMENTS

| | | |
|---|---|---|
| DE | 4240012 A1 | 6/1994 |
| DE | 102016206394 A1 | 10/2017 |
| DE | 102016222418 A1 | 5/2018 |
| DE | 102017130886 A1 | 6/2019 |
| DE | 102019101576 A1 | 7/2020 |

* cited by examiner

*Primary Examiner* — Brandon D Lee
(74) *Attorney, Agent, or Firm* — Michael Best & Friedrich LLP

(57) ABSTRACT

A method for operating an exhaust-gas burner (B) of a vehicle (100) which has at least an internal combustion engine (V) and a catalytic converter (C1, C2), wherein exhaust gases (22, 24) of the exhaust-gas burner (B) are merged, upstream of the catalytic converter (C1, C2), with exhaust gases (12) of the internal combustion engine (V), forming an exhaust-gas mixture, wherein a lambda value of the exhaust gases (22, 24) of the exhaust-gas burner (B) is set in a manner dependent on a lambda value of the exhaust gases (12) of the internal combustion engine (V).

12 Claims, 1 Drawing Sheet

LAMBDA COMPENSATION WITH EXHAUST-GAS BURNER

BACKGROUND OF THE INVENTION

The present invention relates to a method for operating an exhaust-gas burner of a vehicle, and to a processing unit and a computer program for carrying out said method.

For exhaust-gas aftertreatment, use is commonly made of catalytic converters which chemically convert particular exhaust-gas components, for example carbon monoxide, hydrocarbons, various nitrogen oxides and/or sulfur oxides.

In many vehicles with an internal combustion engine, lambda probes or lambda sensors are used in order to perform closed-loop control of the fuel/combustion air ratio. The lambda value corresponds to a stoichiometry ratio between combustion oxygen and fuel molecules, wherein a value of one means that exactly as much oxygen is present in the combustion chamber as is theoretically required for the complete combustion of the fuel. Lambda values higher than one indicate an excess of oxygen (lean mixture), and values lower than one indicate a deficiency of oxygen (rich mixture) in the combustion chamber.

In general, the lambda value is adjusted by closed-loop control to a value of one in order to achieve an optimum effect of the catalytic converter. However, there are requirements which deviate from this, for example in order to regenerate a particle filter or carry out particular diagnostic procedures, for example for lambda probes or catalytic converters, or for so-called catalytic converter heating. Such situations can be partially covered by means of oxygen storage components in the catalytic converter. However, in the case of a deviation which lasts for a long period of time, it may however be the case that pollutants are released into the environment.

It is therefore desirable to specify an improved method for exhaust-gas aftertreatment.

SUMMARY OF THE INVENTION

According to the invention, a method for operating an exhaust-gas burner of a vehicle, and also a processing unit and a computer program for carrying out said method, having the features of the independent patent claims are proposed.

In a method according to the invention for operating an exhaust-gas burner of a vehicle which has at least one internal combustion engine and at least one catalytic converter, exhaust gases of the exhaust-gas burner are merged, upstream of the at least one catalytic converter, with exhaust gases of the internal combustion engine, forming an exhaust-gas mixture, wherein a lambda value of the exhaust gases of the exhaust-gas burner is set in a manner dependent on a lambda value of the exhaust gases of the internal combustion engine. In this way, the internal combustion engine can be operated with an irregular lambda value even for relatively long periods of time, and the lambda value of the mixed exhaust gas can nevertheless be regular, such that the mixed exhaust gas can react in a regular manner in a catalytic converter downstream of the merging point of the internal combustion engine and of the exhaust-gas burner. Equally, it is also possible for the lambda value of the exhaust gases of the internal combustion engine to be set in a manner dependent on the lambda value of the exhaust gases of the exhaust-gas burner, with the aim of attaining a particular target lambda value of the mixed exhaust gas, preferably a value of one.

The internal combustion engine may be, in particular, an Otto-cycle engine or a rotary piston engine ("Wankel engine"). The internal combustion engine is advantageously operable, in normal operation, with an air-fuel mixture of stoichiometric composition, in particular using gasoline, ethanol, natural gas or autogas as fuel. In this way, an exhaust gas with a lambda value close to the target value of one is generated over a predominant part of an operating duration.

Here, the exhaust-gas burner is advantageously operated in a rich operating mode (burner lambda value lower than 1) if the internal combustion engine is operated in a lean operating mode, and is operated in a lean operating mode (burner lambda value higher than 1) if the internal combustion engine is operated in a rich operating mode. It is thus possible for the exhaust-gas burner to compensate a lambda value of the exhaust gas of the internal combustion engine in the direction of a lambda value of one.

Likewise, it is however advantageous in certain situations if the internal combustion engine is operated in a stoichiometric operating mode and the exhaust-gas burner is operated in a rich operating mode or in a lean operating mode in order to correspondingly specify the target lambda value of the exhaust-gas mixture, for example because a component in the exhaust-gas tract requires this particular target lambda value for a particular function. In this case, the internal combustion engine can nevertheless be operated stoichiometrically, which is optimal for example for a three-way catalytic converter, and the burner can set a target lambda value for a downstream particle filter or the like. The lambda value of the exhaust gases of the exhaust-gas burner is advantageously set such that the exhaust-gas mixture has a desired target lambda value, in particular one. In this way, particularly low pollutant concentrations downstream of the at least one catalytic converter can be achieved.

It is advantageous if a fill level of the at least one catalytic converter is ascertained, and the lambda value of the exhaust gases of the exhaust-gas burner is set such that the fill level of the at least one catalytic converter does not depart from a predetermined fill level range which is bounded by one (semi-open) or two threshold values. It can thus be ensured that an exhaust-gas flow emitted from the vehicle does not contain undesired components, or contains undesired components only to a degree that does not exceed predetermined threshold values, in particular legally set threshold values, irrespective of varying operating states of the internal combustion engine.

Here, the fill level of the at least one catalytic converter describes in particular a presently stored quantity of oxygen and/or nitrogen oxides, for example in absolute terms or relative to a maximum possible storage quantity. This is advantageous because catalytic converters can store a particular quantity of these substances and can thus, for example, bridge periods of time with changed exhaust-gas composition without impairment of their catalysis function. However, the storage capacity is naturally limited, such that it is necessary to prevent the store from becoming empty or full. This can be ensured through the monitoring of the fill level and corresponding control of the exhaust-gas burner.

Here, the exhaust-gas burner is advantageously operated in a rich operating mode if the fill level of the at least one catalytic converter approaches one fill level range limit, for example a first threshold value, and/or operated in a lean operating mode if the fill level of the at least one catalytic converter approaches the other fill level range limit, for example a second threshold value. The exhaust-gas burner can thus be operated in each case such that the exhaust gas generated by the exhaust-gas burner compensates fluctuations in composition or lambda of the exhaust gas of the internal combustion engine, and thus the at least one catalytic converter can be operated at an optimum operating point at all times. Cyclic operation of a catalytic converter can also be advantageously realized in this way without the need to accept intermittently increased pollutant concentrations in the exhaust gas.

The fill level is advantageously ascertained or calculated using a catalytic converter model. In this way, it is possible for measuring devices, in particular lambda probes, which are already present in any case to be used for monitoring the fill level, which has a positive effect on implementation costs. For this purpose, it is for example possible to use a model as described in DE 10 2016 222 418 A1.

If it is identified that the fill level of the catalytic converter departs from a predetermined fill level range, the exhaust-gas burner is advantageously operated such that its exhaust gas compensates a deviation, caused by the departure from the fill level range, of the lambda value of the exhaust gas from a target lambda value, which is in particular one. In this way, emissions of undesired pollutants can be reliably prevented, because a departure from the specified fill level range is identified in particular before a breakthrough of the undesired exhaust-gas components.

The method is particularly advantageous if, here, a dead time (or flow time) of the exhaust gas from the internal combustion engine and/or a dead time of the exhaust gas from the exhaust-gas burner in each case to the merging point of the exhaust gases is ascertained, and the exhaust-gas burner is operated such that its exhaust gas is fed into the merging point at the same time as that exhaust gas of the internal combustion engine whose lambda value was used for the setting of the lambda value of said exhaust-gas burner. In this way, the exhaust-gas burner can be controlled in terms of timing such that the mutually associated exhaust-gas flows arrive at the merging point at the same time, and thus the compositions are optimally coordinated with one another.

Closed-loop control or open-loop control of the lambda value is generally possible by virtue of a lambda value of a gas flow being measured, for example by means of one or more lambda sensors or lambda probes, and an operating parameter which influences the composition of the respective gas flow being controlled on the basis of said measured value. In particular, as operating parameter, use may be made of the composition, the quantity, the pressure and/or the temperature of an air-fuel mixture fed to the internal combustion engine and/or to the exhaust-gas burner, or of one or more of the components of said air-fuel mixture. Pilot control and/or disturbance variable compensation using various influencing parameters is also possible. For example, in order to implement particular functions, a different lambda value may be provided in particular partial flows than is the case during normal operation. It is thus for example also possible for the temperature, the operating duration or a fault state of particular components to be taken into consideration as influential variables for the open-loop or closed-loop control.

It is advantageous if a lambda value of an exhaust gas at at least one point immediately downstream of the internal combustion engine and/or immediately downstream of the exhaust-gas burner and/or immediately downstream of the at least one catalytic converter and/or immediately downstream of the merging point of the exhaust gases of the internal combustion engine and of the exhaust-gas burner is detected. In this way, very precise open-loop control and/or closed-loop control of the respective exhaust-gas flows is possible in each case.

Preferably, a target lambda value is set which is required for the implementation of a function of one or more components of the exhaust-gas aftertreatment system. For this purpose, the internal combustion engine may be operated so as to generate an exhaust gas which has the target lambda value, or the exhaust-gas burner may be operated such that the mixed exhaust gas downstream of the merging point of the burner exhaust gas with the exhaust gas of the internal combustion engine has the target lambda value. Here, the target lambda value may be one or may be a value which deviates from one, that is to say may be higher than or lower than one.

For example, the internal combustion engine may be operated so as to generate an exhaust gas whose lambda value intentionally deviates from one. In such a case, in the exhaust-gas aftertreatment system, a function is implemented which requires such a lambda value, in particular in order to regenerate a particle filter, for so-called catalytic converter heating or for particular diagnostic procedures, for example for lambda probes or catalytic converters. In such cases, the exhaust-gas burner is in particular operated such that an exhaust gas exiting the exhaust-gas aftertreatment system has a lambda value of one, that is to say the targeted deviation downstream of the component which performs the function is compensated through corresponding control of the lambda value of the burner exhaust gas.

It is self-evident that the exhaust-gas burner need not imperatively be operated continuously. Rather, it may also be advantageous for it to be operated in particular when an exhaust-gas lambda value of the internal combustion engine or a fill level of a catalytic converter deviates from a desired value. In this way, it is for example possible to save fuel.

A processing unit according to the invention, for example a control unit of a motor vehicle, is configured, in particular in terms of programming technology, to carry out a method according to the invention.

Also, the implementation of a method according to the invention in the form of a computer program or computer program product with program code for carrying out all of the method steps is advantageous, because this results in particularly low costs, in particular if an executing control unit is also utilized for other tasks and is therefore present in any case. Suitable data carriers for the provision of the computer program are in particular magnetic, optical and electrical memories, such as for example hard drives, flash memories, EEPROMs, DVDs and others. A download of a program via computer networks (Internet, intranet etc.) is also possible.

Further advantages and refinements of the invention will emerge from the description and from the appended drawing.

The invention is schematically illustrated on the basis of an exemplary embodiment in the drawing, and will be described below with reference to the drawing.

DETAILED DESCRIPTION

Figure 1:
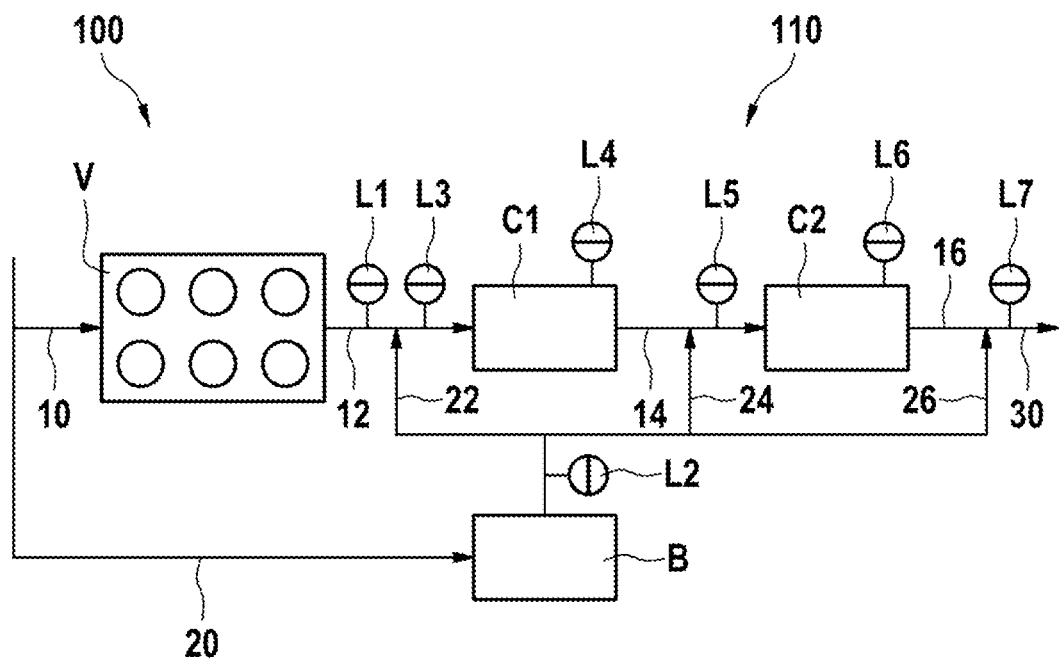
FIG. 1 shows, in a highly schematic illustration, a vehicle which is configured for carrying out an advantageous embodiment of a method according to the invention.

FIG. 1 schematically illustrates a vehicle 100 with an internal combustion engine V and an exhaust-gas aftertreatment system 110.

The internal combustion engine V may be designed for example in the form of an Otto-cycle engine, a diesel engine and/or a Wankel or rotary piston engine. A lean-burn engine with applied ignition may also be used as the internal combustion engine V.

The exhaust-gas aftertreatment system 110 is arranged downstream of the internal combustion engine V and comprises at least one, in the illustrated example two, catalytic converter(s) C1, C2, an exhaust-gas burner B and one or more sensors L1 to L7, of which at least one is in the form of a lambda probe L1.

The exhaust gas 22, 24, 26 of the exhaust-gas burner B can in this case be merged with the exhaust gas 12 of the internal combustion engine V at various points. Possible points for the merging are in each case upstream and downstream of the two catalytic converters, because respectively different compositions of the exhaust gas 12, 14, 16 of the internal combustion engine V are to be expected at these points.

The sensors L1 to L7 may also be positioned at different points, wherein, in particular in each case immediately upstream and downstream of components C1, C2, B of the exhaust-gas aftertreatment system 110, particularly relevant values for the control of the respective components can be detected. It is particularly expedient in this context for the lambda probe L1 to be immediately downstream of the internal combustion engine V, such that this is provided in any case, and the other sensors can possibly be omitted, in particular if mathematical methods are used for ascertaining the exhaust-gas composition at other points in the exhaust-gas aftertreatment system 110.

One of the two illustrated catalytic converters C1, C2 may for example comprise a three-way catalytic converter C1 (for Otto-cycle engines; for example $NO_x$ storage catalytic converter or oxidation catalytic converter for diesel engines), whereas a further catalytic converter C2 may likewise comprise a three-way catalytic converter or a particle filter (coated or non-coated) (for Otto-cycle engines; for example SCR catalytic converter or particle filter for diesel engines). Here, it is expressly pointed out that the relative arrangement of the catalytic converters C1, C2 with respect to one another is illustrated here merely by way of example, and that it may also be advantageous for these to be arranged in a reversed sequence. Furthermore, provision may be made for further similar and/or different catalytic converters and/or filter systems, for example soot particle filters, to be integrated into the exhaust-gas aftertreatment system 110. It is also possible for multiple different catalytic converter types to be combined in one single multifunctional catalytic converter, as is conventional for example in a three-way catalytic converter.

By means of the lambda probe L1, the lambda value of the exhaust gas 12 of the internal combustion engine V is monitored and possibly set or controlled in closed-loop fashion. In a preferred embodiment of the invention, in operating phases in which said lambda value deviates from one, the exhaust-gas burner B is operated so as to feed to the exhaust gas 12 of the internal combustion engine V a burner exhaust gas 22, 24, 26 which at least partially compensates said deviation. For example, provision may be made for the internal combustion engine V to be operated in a rich (or lean) operating mode in order to realize an increased fraction of incompletely burned fuel in an exhaust-gas flow 12. This may be expedient for various functions, for example in order to heat the catalytic converter C1, C2 upon a commencement of travel when the exhaust-gas aftertreatment system 110 is still cold, such that said catalytic converter reaches its operating temperature as quickly as possible, or in order to heat a particle filter to a temperature required for the combustion of particles. Analysis or diagnostic functions, for example for monitoring the function of a lambda probe L1 to L7 or of a catalytic converter C1, C2 may also require a rich (or lean) exhaust-gas mixture.

If the internal combustion engine V is operated in a rich operating mode, such that fuel 10 fed to the internal combustion engine V is transferred in incompletely burned form into the exhaust gas 12 of the internal combustion engine V, the exhaust-gas burner B provides a lean exhaust gas 22, 24, 26 in order to provide additional oxygen for the combustion of the fuel residues. In particular, here, the exhaust-gas burner B is operated such that an exhaust gas 30 exiting the exhaust-gas aftertreatment system 110 has a lambda value of one, that is to say completely compensates the deviations of the lambda value of exhaust gas 12 of the internal combustion engine V from one.

Figure 2:
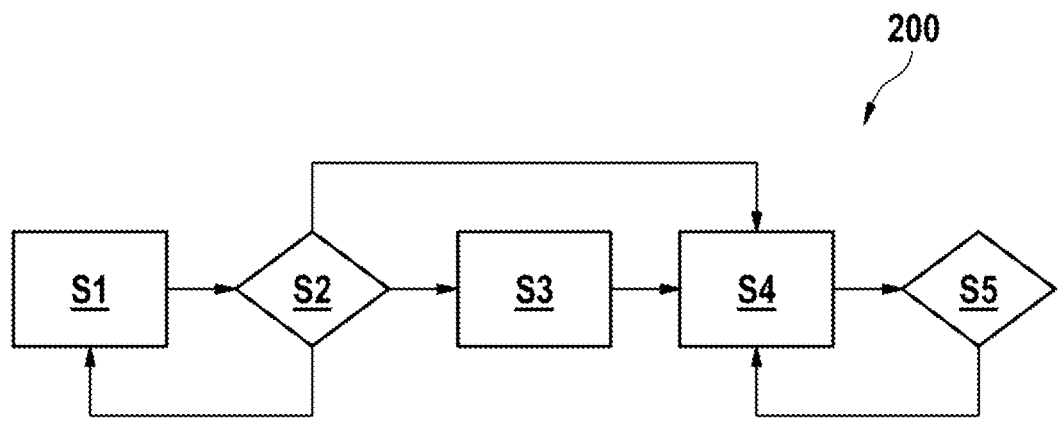
FIG. 2 shows, in the form of a simplified flow diagram, an advantageous refinement of a method according to the invention.

Such a method is also schematically illustrated in FIG. 2, and is denoted as a whole by 200. In a step S1, an air-fuel mixture 10 is set and an internal combustion engine V is operated therewith, wherein an exhaust gas 12 is generated. In a step S2, a lambda value of said exhaust gas 12 is measured, for example using the lambda probe L1. The lambda value measured in step S2 is used in the context of an in particular closed control loop for setting the air-fuel mixture 10 in the step S1.

If the lambda value corresponds to a first target lambda value which is required for a function, for example a catalytic converter regeneration, the function is performed in a step S3 using the exhaust gas 12 which has the first target lambda value. In the example illustrated, it is accordingly the case in step S3 that the catalytic converter C1, in this case a three-way catalytic converter C1, is heated. For this purpose, the exhaust gas is in particular rich, that is to say has a lambda value of lower than one.

In order to prevent undesired constituents of the exhaust gas 14 that exits the catalytic converter C1 from being released into the environment, in a step S4, the exhaust-gas burner B is operated using the lambda value measured in step S2 such that the exhaust-gas mixture formed downstream of the merging point of catalytic converter exhaust gas 14 and burner exhaust gas 24 has a second target lambda value, which is for example one.

In the illustrated example, the lambda value of the exhaust-gas mixture is measured in a step S5, for example using a further lambda probe L5. The lambda value measured in step S5 is used for the closed-loop and/or open-loop control of the exhaust-gas burner in S4.

In the illustrated example, at least one of the catalytic converters C1, C2 has a storage function. For example, the three-way catalytic converter C1 can store a particular quantity of oxygen. Particular types of $NO_x$ storage catalytic converters also have a storage capacity for nitrogen dioxide, which is limited to a maximum storage capacity.

The values ascertained by means of the one or the multiple sensors L1 to L7, for example the lambda probe L1, may at least partially be used to determine a fill level of at least one catalytic converter C1, C2. In a preferred embodiment of the invention, the lambda value of the exhaust gases 22, 24 of the exhaust-gas burner B may also be set such that the fill level of the catalytic converter C1 or C2 does not depart from a predetermined fill level range. Therefore, if the fill level approaches a fill level range limit, for example reaches a predetermined first threshold value which lies for example close to the maximum storage capacity, for example at 90% of the storage capacity, the burner B and possibly also the internal combustion engine V are controlled such that the store is emptied again.

It may also be the case that, in order to ensure the catalysis function of a catalytic converter, a particular minimum fill level of the catalytic converter must be present. This is the case for example in three-way catalytic converters, which require oxygen in order to oxidize pollutants from the exhaust gas fed thereto. In such cases, it is expedient for the burner B to be controlled such that the fill level does not fall below a predetermined threshold value, which may for example lie close to said minimum fill level.

A similar approach is for example also advantageous for a $NO_x$ storage catalytic converter at the point C1 (also referred to as lean $NO_x$ trap or nitrogen oxide trap), because this requires an oxygen-depleted atmosphere for the reduction of the stored nitrogen oxides. The $NO_x$ storage catalytic converter may thus for example be positioned close to the internal combustion engine V and supplied with an exhaust gas 12 of the internal combustion engine V. In order to empty the nitrogen oxide store, the exhaust gas 12 may be provided as rich exhaust gas. For this purpose, by way of example, a rich air-fuel mixture 10 is fed to the internal combustion engine V.

Downstream of the $NO_x$ storage catalytic converter C1, an exhaust gas 24 of the exhaust-gas burner B can be merged with an exhaust gas 14 of the catalytic converter C1. Downstream of the merging point, there may be arranged a three-way catalytic converter C2 in order to oxidize hydrocarbons and/or carbon monoxide present in the exhaust-gas mixture 14, 24, for which purpose oxygen is required. Said oxygen required for the purposes of oxidation may be stored in the three-way catalytic converter C2 and/or provided by way of the burner exhaust gas 24 through suitable setting of the operating parameters of the exhaust-gas burner B.

The provision of a rich exhaust-gas mixture upstream of the $NO_x$ storage catalytic converter C1 may also be performed using the burner B by virtue of said burner being operated such that a combustion of air-fuel mixture 20 fed thereto does not take place completely. A corresponding rich burner exhaust gas 22 can then be admixed to the exhaust gas 12 of the internal combustion engine V in order to feed to the $NO_x$ storage catalytic converter C1 the rich exhaust gas 12, 22 required for the regeneration (or emptying of the store). In this way, it is not necessary to intervene in the operating parameters of the internal combustion engine V in order to generate a rich exhaust gas 12, which can have a positive effect on the power output by the internal combustion engine or on the efficiency of said internal combustion engine, for example.

The fill level of the corresponding catalytic converters C1, C2 can be determined in each case separately, such that the function of the exhaust-gas aftertreatment system 110 can be controlled in a very precise manner. It is the case for example that in each case data from at least one sensor L1 to L7 are used for fill level monitoring. For example, the lambda values ascertained by the lambda probe L1 can be used to determine a profile with respect to time of the oxygen concentration in the exhaust gas 12 of the internal combustion engine V. Since the dimensioning of the catalytic converters is known, it is possible from this profile with respect to time of the oxygen concentration to infer the fill level of the oxygen store of the three-way catalytic converter C2. Particularly advantageous in this context is the calculation of a mathematical model of the catalytic converter C2 in order to exactly ascertain the respectively required intervention time for the burner control. In this way, the control can be limited to a required minimum, which increases the efficiency of such a method. Values of further lambda probes L2, L3, L5, L7 at other points, which may for example be situated immediately upstream and/or downstream of the three-way catalytic converter C2, may advantageously also be used in order to increase precision.

In particular embodiments, it is also provided that the fill level of the three-way catalytic converter C2 and/or of the NOx storage catalytic converter C1 are detected directly by means of a corresponding sensor L4, L6. Such a sensor L4, L6 may for example be a partial pressure sensor which selectively measures the partial pressure of a particular exhaust-gas component, in particular oxygen or nitrogen dioxide. For this purpose, it is advantageous for such a partial pressure sensor L4, L6 to be arranged in the vicinity of an outlet of the corresponding catalytic converter C1, C2 in order to identify if there is a risk of a breakthrough of pollutants into the exhaust gas 14, 16 respectively flowing downstream. It is thus possible for the composition of the corresponding exhaust-gas flow 12, 22 or 14, 24 that is fed to the respective catalytic converter C1, C2 to be adapted in each case in good time.

Further purification systems may likewise be provided within the exhaust-gas aftertreatment system 110. For example, a soot particle filter (not illustrated) may be provided downstream of the three-way catalytic converter C2. To empty a soot particle filter of said type, it may be necessary to heat the soot particle filter to a particular temperature and/or to set a particular oxygen content in the exhaust gas 16 that is fed to the soot particle filter. For this purpose, it is advantageously likewise possible to use the exhaust-gas burner B, for example by virtue of the latter being operated such that it initially introduces a rich exhaust-gas flow 26 into the exhaust gas 16 in order, together with residual oxygen contained in the exhaust gas 16 exiting the three-way catalytic converter, to effect an exothermic combustion reaction upstream of the soot particle filter or in the soot particle filter. When the required temperature has been reached, the operation of the exhaust-gas burner B can be reversed such that it outputs a hot and oxygen-rich exhaust-gas flow 26 in the direction of the soot particle filter in order to burn soot particles in the soot particle filter and thus regenerate the filter. The composition of the burner exhaust gas 26 can in this case be monitored for example by means of the lambda probe L2 provided for this purpose, and the composition of the exhaust-gas mixture 30 exiting the exhaust-gas aftertreatment system 110 by means of the corresponding sensor L7.

It is expressly pointed out here once again that the relative position of the individual sensors L1 to L7 with respect to one another and with respect to the other components C1, C2, B of the exhaust-gas aftertreatment system 110 is not necessarily limited to the embodiments described here. A method according to the invention may for example also be carried out with considerably fewer, for example one or two, sensors.

Also, the introduction of the burner exhaust gases 22, 24, 26 is, as mentioned, not provided at all three described points in all embodiments. In this context, it is crucial that the introduction of the burner exhaust gases causes an at least partial compensation of deviations of the lambda value of the exhaust gas 12 of the internal combustion engine V, and is in particular performed and controlled such that the departure from a predetermined fill level range of at least one of the catalytic converters C1, C2 is thereby prevented. In particular cases, the burner may for example be used in the context of closed-loop lambda control in order to set a predetermined lambda value in one of the exhaust-gas flows, for example in the exhaust gas 14, 24 that is fed to the catalytic converter C2.

It is expressly pointed out here that, in all of the exhaust-gas flows 12, 14, 16, 22, 24, 26, 30, there is in each case a resulting lambda value which is determined by the operation of the internal combustion engine V and/or of the exhaust-gas burner B. A target lambda value in these exhaust-gas flows may for example be one, though it is also possible in particular operating modes to set target lambda values which deviate from one. A target lambda value may thus be one, higher than one or lower than one. The internal combustion engine may for example generate a rich or a lean exhaust-gas mixture, for example in order to allow particular functions of the catalytic converter C1. Stoichiometric operation of the internal combustion engine may also be provided in particular operating modes. Likewise, the exhaust-gas burner may be operated both lean or rich, or else stoichiometrically or even not at all, depending on what target lambda value is to be set downstream of the merging point.

The invention claimed is:

1. A method for operating an exhaust-gas burner of a vehicle which has at least an internal combustion engine and a catalytic converter, wherein an exhaust gas of the exhaust-gas burner and an exhaust gas of the internal combustion engine merge upstream of the catalytic convertor to form an exhaust gas mixture, the method comprising:
receiving, from a lambda probe immediately downstream of the internal combustion engine, a lambda value of the exhaust gas of the internal combustion engine;
ascertaining a fill level of the catalytic converter; and
operating the exhaust-gas burner based on the lambda value of the exhaust gas of the internal combustion engine and the fill level,
wherein, when it is identified that the fill level of the catalytic converter departs from a predetermined fill level range, the exhaust-gas burner is operated such that the exhaust gas of the exhaust-gas burner compensates a deviation of the lambda value of the exhaust-gas burner from a target lambda value caused by the departure from the fill level range.

2. The method according to claim 1, wherein the exhaust-gas burner is operated such that a lambda value of the exhaust gas mixture reaches a desired target lambda value.

3. The method according to claim 2, wherein the exhaust gas of the internal combustion engine have a first lambda value and the exhaust gas of the exhaust-gas burner have a second lambda value, and wherein a component of an exhaust-gas tract of the vehicle performs a function, wherein the component requires an exhaust gas having has the first lambda value, the second lambda value or the target lambda value, wherein the function comprises a diagnosis, a regeneration, and/or a change in temperature of the component.

4. The method according to claim 1, wherein the exhaust-gas burner is operated in a rich operating mode when the internal combustion engine is operated in a lean operating mode, and is operated in a lean operating mode when the internal combustion engine is operated in a rich operating mode.

5. The method according to claim 1, wherein the internal combustion engine is operated in a stoichiometric operating mode and the exhaust-gas burner is operated in a rich operating mode or in a lean operating mode.

6. The method according to claim 1, wherein the fill level is ascertained using a catalytic converter model.

7. The method according to claim 1, wherein the exhaust-gas burner is operated such that the fill level of the catalytic converter does not depart from a predetermined fill level range.

8. The method according to claim 1, wherein the fill level of the catalytic converter describes a presently stored quantity of oxygen and/or nitrogen oxides.

9. The method according to claim 1, wherein a dead time of the exhaust gas from the internal combustion engine and/or a dead time of the exhaust gas from the exhaust-gas burner in each case to a merging point of the exhaust gas of the exhaust-gas burner and the exhaust gas of the internal combustion engine is ascertained, and the exhaust-gas burner is operated such that the exhaust gas of the exhaust-gas burner is fed into the merging point at the same time as that the exhaust gas of the internal combustion engine.

10. The method according to claim 1, wherein a lambda value of an exhaust gas at at least one point immediately downstream of the internal combustion engine and/or immediately downstream of the exhaust-gas burner and/or immediately downstream of the at least one catalytic converter and/or immediately downstream of a merging point of the exhaust gas of the internal combustion engine and the exhaust gas of the exhaust-gas burner is detected using one or more lambda sensors.

11. An electronic processing unit for controlling an exhaust-gas burner of a vehicle which has at least an internal combustion engine and a catalytic converter, wherein an exhaust gas of the exhaust-gas burner and an exhaust gas of the internal combustion engine merge upstream of the catalytic convertor to form an exhaust gas mixture, the electronic processing unit being configured to
receive, from a lambda probe immediately downstream of the internal combustion engine, a lambda value of the exhaust gas of the internal combustion engine;
ascertain a fill level of the catalytic converter; and
operating the exhaust-gas burner based on the lambda value of the exhaust gas of the internal combustion and the fill level,
wherein, when it is identified that the fill level of the catalytic converter departs from a predetermined fill level range, the exhaust-gas burner is operated such that the exhaust gas of the exhaust-gas burner compensates a deviation of the lambda value of the exhaust-gas burner from a target lambda value caused by the departure from the fill level range.

12. A non-transitory, computer-readable medium containing instructions that when executed by a computer cause the computer to control an exhaust-gas burner of a vehicle which has at least an internal combustion engine and a catalytic converter wherein an exhaust gas of the exhaust-gas burner and an exhaust gas of the internal combustion engine merge upstream of the catalytic convertor to form an exhaust gas mixture, by
receiving, from a lambda probe immediately downstream of the internal combustion engine, a lambda value of the exhaust gas of the internal combustion engine;
ascertaining a fill level of the catalytic converter; and
operate the exhaust-gas burner based on the lambda value of the exhaust gas of the internal combustion engine and the fill level,
wherein, when it is identified that the fill level of the catalytic converter departs from a predetermined fill level range, the exhaust-gas burner is operated such that the exhaust gas of the exhaust-gas burner compensates a deviation of the lambda value of the exhaust-gas burner from a target lambda value caused by the departure from the fill level range.

* * * * *